United States Patent [19]

Meir

[11] Patent Number: 4,665,332

[45] Date of Patent: May 12, 1987

[54] ELECTRIC GENERATOR ASSEMBLY FOR A PROJECTILE

[75] Inventor: Avraham A. Meir, Willow Grove, Pa.

[73] Assignee: Seti, Inc., Montgomeryville, Pa.

[21] Appl. No.: 865,235

[22] Filed: May 20, 1986

[51] Int. Cl.[4] ............................................. H02K 7/10
[52] U.S. Cl. .................................... 310/77; 102/208; 310/68 E; 310/51; 310/75 R; 290/52
[58] Field of Search ............... 310/75 R, 68 B, 68 E, 310/77, 51, 92–97; 102/207, 208, 221–227, 245, 251, 200, 202.5, 202.12; 415/13; 367/140; 290/52, 54

[56] References Cited

U.S. PATENT DOCUMENTS

| | | | |
|---|---|---|---|
| 2,468,120 | 4/1949 | Senn | 102/208 |
| 2,511,872 | 6/1950 | Parker | 102/208 |
| 3,140,661 | 7/1964 | Clarke | 102/208 |
| 3,514,649 | 5/1970 | Nomura | 310/68 E |
| 3,961,577 | 6/1976 | O'Steen | 102/208 |

FOREIGN PATENT DOCUMENTS

| | | | |
|---|---|---|---|
| 1452032 | 9/1966 | France | 102/208 |
| 6757 | of 1913 | United Kingdom | 102/208 |

*Primary Examiner*—Mark O. Budd
*Attorney, Agent, or Firm*—Panitch Schwarze Jacobs & Nadel

[57] ABSTRACT

A rotational brake member controls the rotational velocity of an electric generator assembly housed within a projectile. The assembly includes an air-driven turbine and an electric generator. The brake member is affixed to the turbine which drives a rotatable element of the generator to produce electric power. The brake member is formed from an elastically deformable material and is adapted to contact the stationary surface proximate the periphery of the brake member at a predetermined angular velocity. In addition, a shock absorbing member formed from an inelastically deformable material is positioned to absorb shock to the turbine when the projectile is fired. Preferably, the generator further includes an elastomeric seat for biasing the turbine away from the shock absorbing member after the projectile has been fired.

20 Claims, 4 Drawing Figures

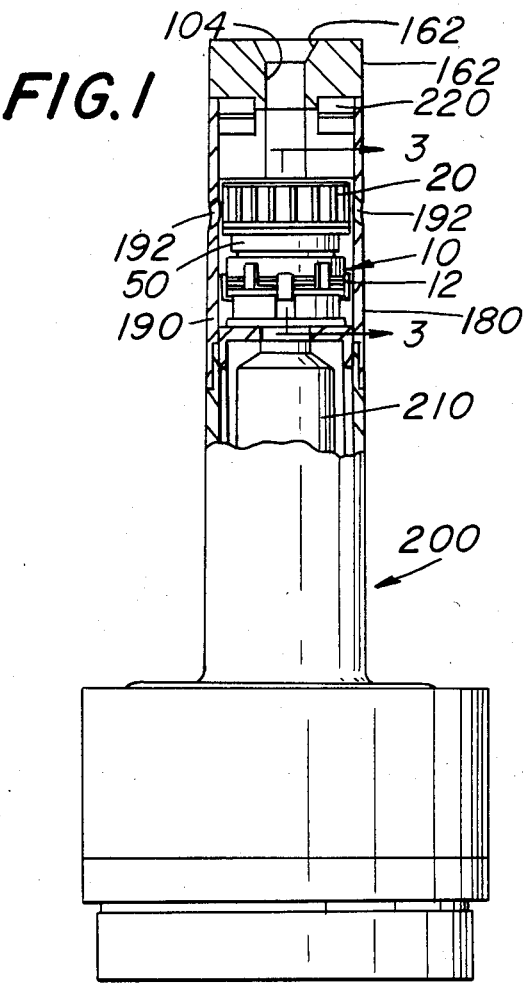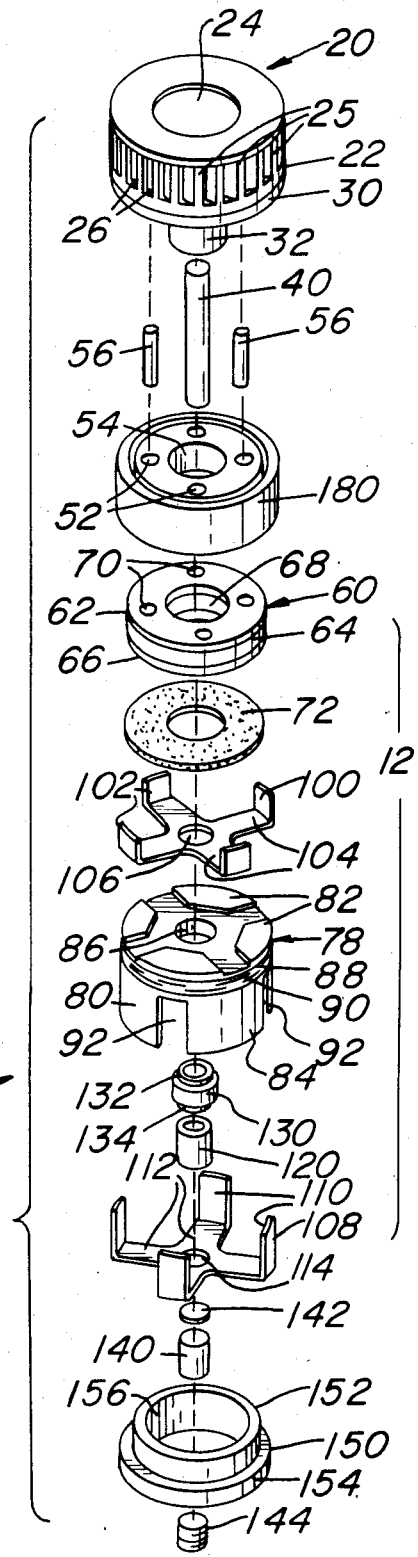

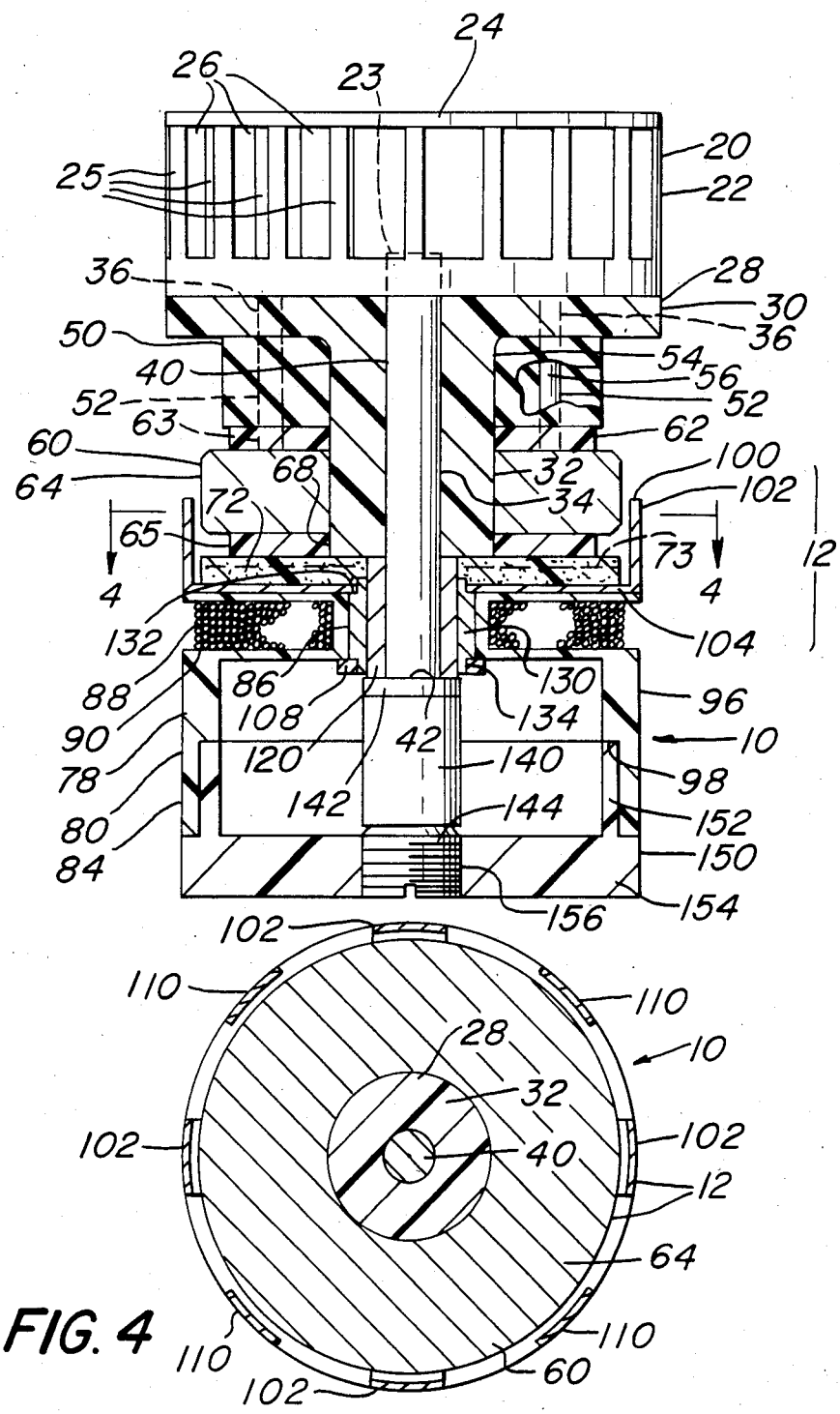

ELECTRIC GENERATOR ASSEMBLY FOR A PROJECTILE

BACKGROUND OF THE INVENTION

The present invention relates to electric generator assemblies for projectiles; and more particularly to assemblies including turbine-driven electrical generators adapted to power electrical sensing and control apparatus in projectiles such as artillery shells, rockets, and the like.

Military applications provide a constant and strong demand for new electronic technology. One aspect of this demand has been the application of electronic technology to military ordnance. Increasingly, projectiles have been equipped with sophisticated electronic sensing and control devices. These devices share a common requirement: A reliable, inexpensive source of electric power to operate them.

In the past, electrical devices associated with projectiles such as proximity and timing fuzes have often been powered by storage batteries. However, a number of problems are associated with the use of storage batteries. For example, storage battery-equipped fuzes, like other types of military hardware, must be designed to be stored for long periods of time prior to use in order to minimize logistic costs, and yet be instantly available for use when necessary. Dry cell batteries have limited useful lives. Wet cell batteries are used such that the electrolytic fluid is injected automatically into the electrodes, as a result of shell spin after leaving the gun. Batteries may not be stored separately from the electrical portion of the fuze which they are to power, but must be preassembled with the fuzes, for logistic and "ready available" reasons. Thus, the batteries or battery-equipped fuzes must be assembled into the projectiles before the ordnance can be used. Some types of battery-equipped fuzes have proven very unreliable, as a result of electrolyte fluid leakage.

An alternative source of electrical power for projectiles is the air turbine-driven electric generator. Compared with batteries, generators have the advantage of unlimited storage lives. However, prior art electrical generators driven by air turbines suffer from a number of disadvantages. Generally, they are expensive to manufacture. Further, the impellers used in prior art generators are generally very inefficient in that most of the air taken in by the turbine is diverted rather than used to drive the impeller. Typically, an air intake is provided in the nose of the projectile in which the generator is mounted. The large air volume required by prior art generators substantially alters the aerodynamic characteristics of the projectile, resulting in altered trajectories and firing ranges. The large volume required also makes the projectile performance characteristics more sensitive to atmospheric conditions such as barometric pressure and precipitation than are projectiles having battery powered electrical equipment.

Prior art turbines typically operate at very high angular velocities which may range well over 100,000 RPM. Consequently, the dynamic balance of the generator must be precise, requiring the use of expensive ball bearings and other precision parts. Further, because the rate of rotation of the turbine depends on the projectile's velocity, the frequency of the generator's output varies over the course of the projectile's trajectory. Thus, the electrical current generated may require conditioning before it can be used to power some types of frequency-sensitive devices.

When used in projectiles, air turbine-driven generators experience substantial acceleration forces in the barrel from which the projectile is fired. Prior art generators which require precision axial thrust bearings to achieve and maintain high angular velocities during the projectile's trajectory have an unacceptably high failure rate because the precision bearings tend to be damaged when the projectile is fired.

Thus, there is a need for a source of electrical power for the electrical equipment associated with modern day projectiles which is inexpensive, reliable, and readily available without the extra processing steps associated with activation of some types of storage batteries and which overcomes the problems associated with presently available air turbine-driven generators. The present invention meets these needs and has other advantages as described below.

SUMMARY OF THE INVENTION

The present invention includes a rotatable brake member for controlling the angular velocity of an electric generator assembly housed within a projectile. The assembly includes an air-driven turbine and an electric generator having a rotatable element and a stationary element. The brake member is affixed to the turbine which rotationally drives a rotatable element of the generator to produce electric power. The brake member comprises an elastically deformable material which is adapted to contact a stationary surface proximate the periphery of the brake member at a predetermined angular velocity.

The present invention further includes a shock absorbing member for the electric generator assembly. The shock absorbing member comprises an inelastically deformable material positioned to absorb shock to the turbine when the projectile is fired.

In a preferred embodiment, the present invention includes an electric generator assembly comprising both the rotatable brake member and the shock absorbing member. Preferably, the generator further includes biasing means for biasing the turbine away from the shock absorbing member after the projectile has been fired.

BRIEF DESCRIPTION OF THE DRAWINGS

The foregoing summary as well as the following detailed description of a presently preferred embodiment of the invention will be better understand when read in conjunction with the appended drawings. It is understood, however, that this invention is not limited to the precise arrangements illustrated. In the drawings:

FIG. 1 is a partially sectional elevational view of an electric generator assembly in accordance with a preferred embodiment of the present invention shown mounted in a projectile fuze;

FIG. 2 is an exploded perspective view of the electric generator assembly of FIG. 1;

FIG. 3 is a sectional elevational view of the generator assembly taken generally along the plane of line 3—3 of FIG. 1; and FIG. 4 is a sectional plan view taken generally along the plane of line 4—4 of FIG. 3.

DETAILED DESCRIPTION OF THE PREFERRED EMBODIMENTS

Referring to the drawings wherein like numerals indicate like elements throughout the several views and particularly to FIG. 1, it can be seen that an electric generator assembly 10 according to the present invention is mounted within a projectile fuze 200 to provide electric power during the projectile's trajectory. A central spike 210 supports the electric generator assembly 10 within the fuze 200. The projectile fuze 200 is in turn mounted on a projectile, body or casing such as an artillery shell casing or rocket (not illustrated).

The fuze 200 functions to detonate an explosive charge contained within the projectile when a predetermined condition occurs. For example, the fuze 200 may be adapted to detonate the explosive charge after a predetermined period has elapsed from the time at which the projectile has been fired (time delay fuze). Alternatively, the fuze 200 may serve to detonate the explosive charge on impact (impact fuze). Another alternative is provided by the fuze which detonates the explosive charge when the projectile arrives within the predetermined distance of the target (proximity fuze). Fuzes frequently require a source of electric power to detonate the charge.

Electric power is also required by electric and electronic devices which have been recently adopted to provide other important functions, such as in flight guidance and sensing with the goal of increasing the combat effectiveness of the projectile. The present invention provides an electric generator assembly 10 adapted to provide electric power for the electrical and electronic devices which detonate and guide the trajectory of the modern projectile. These devices may be located within the fuze 200 as well.

FIG. 2 illustrates one presently preferred embodiment of the present invention including an electric generator assembly 10 comprising an electric generator 12 having a rotatable element 60 and a stationary element 78 and an air-driven turbine 20 to which is secured the rotatable element 60.

In the present disclosure "vertical" means parallel to the axis of radial symmetry of the electric generator assembly 10 and to the trajectory of the projectile in which the assembly 10 is installed. Similarly, "top" or "upper" refers to the forward direction relative to the projectile in its trajectory, and "bottom" or "lower" refers to the rearward direction relative to the projectile in its trajectory.

FIG. 1 is a partially sectional view showing a cap member 160 fitted to the forward or upper end of the fuze 200. The cap member 160 has an axial air intake 162 adapted to provide air to drive the turbine 20 of the electric generator assembly 10 as the projectile travels along its trajectory. The air intake 162 has a wall which slopes generally radially inwardly from the front or top surface of the cap member 160 in order to smoothly channel air into the air intake 162. This reduces both aerodynamic drag on the shell which would otherwise occur and turbulence which would decrease the likelihood that the shell would impact at its intended target. From the air intake 162 the air flows down through a generally cylindrical air conduit 164 formed in the fuze 200. Subsequently, the air leaves the air conduit 164 and enters an axial intake aperture 24 formed in the top of the turbine 20, as illustrated in FIG. 2.

The turbine 20 includes a generally cylindrical centrifugal impeller 22 having a plurality of vanes 25. Each vane 25 preferably includes a pair of vertical curved surfaces (not illustrated) arranged such that each vane 25 forms an air foil. Each vane 25 is preferably oriented at an angle to a radius of the impeller 22. The vanes 25 are uniformly spaced around the periphery of the impeller 22 and are separated by air conduits terminating in centrifugal discharge apertures 26 from which air leaves the impeller 22. The impeller 22 also has an axial bore or aperture 23 formed in the lower or bottom surface thereof as best seen in FIG. 3 for a purpose to be described below.

The flow of air through the impeller 22 imparts rotational motion to the impeller 22 which drives the turbine 20. Because the impeller 22 has an efficient centrifugal design, less air flow is required to drive the turbine 20 than in prior art generators. The reduced air flow causes less perturbation of the shell's trajectory than caused by prior art turbine-driven generators, lessening the effect of environmental conditions such as precipitation on the shell's trajectory, and increasing the likelihood that the shell will impact where desired.

The fuze 200 includes a housing 180 for the electric generator assembly 10. The housing 180 includes a generally cylindrical housing wall 190 having a plurality of spaced air exhaust ports 192 symmetrically formed in the housing wall 190. The air exhaust ports 192 are positioned proximate the centrifugal discharge apertures 26 of the impeller 22 when the electric generator assembly 10 is positioned in the housing 180. Preferably, the air discharge ports 192 are formed along axes which are oriented at an angle, for example, 45 degrees, to the rotational axis of the turbine 20 to aid in smoothly discharging air from the turbine 20 with minimal perturbation of the trajectory of the shell.

While a centrifugal impeller 22 is preferred, other types of turbine impellers or runners may also be employed. For example, an axial flow or mixed flow impeller can be substituted for the centrifugal impeller 22 (not shown). Preferably, the impeller 22 is formed from a light weight, high strength material. For example, the impeller 22 can be molded or cast from a synthetic polymeric material such as a reinforced epoxy resin material. The epoxy can be reinforced with a carbon black filler, for example.

Because the turbine 20 rotates at a fairly high angular velocity as discussed below, although significantly lower than prior art projectile air turbine-driven generators, it is preferred that the impeller 22 and other parts of the turbine 20 (with exceptions as noted below) be formed from light weight materials so that the angular momentum of the turbine 20 is minimized. In general, the angular momentum of a rotating member such as the turbine 20 may affect the trajectory of the projectile. Consequently, it is desirable to minimize the angular momentum of rotating members to simplify the control of the trajectory and to increase the accuracy with which the projectile is fired.

As best seen in FIG. 3, the turbine 20 includes the impeller 22 and a sleeve member 28. The sleeve member 28 includes a generally cylindrical upper section 30 and a generally cylindrical lower section 32 formed integrally with the upper section 28. The diameter of the upper section 30 is approximately the same as the diameter of the centrifugal impeller 22. The lower section has a generally cylindrical wall and a generally flat bottom or lower surface. The sleeve member 28 is preferably formed from a light weight high strength material such as a reinforced or filled epoxy resin. A generally cylindrical axial aperture or bore 34 is formed in the sleeve member 28 for a purpose to be described below.

In the present embodiment, the sleeve member 28 has a generally flat top or upper surface and the impeller 22 has a generally flat bottom or lower surface. The impeller 22 is adhesively bonded to the sleeve member 28. An adhesive bonding material, such as an epoxy adhesive, is applied to one or both of the lower surface of the impeller 22 and the upper surface of the sleeve 28, and the two surfaces are placed in contact with one another. Alternatively, the sleeve member 28 and impeller 22 may be cast, molded or otherwise formed as a single integral unit. The impeller 22 and sleeve member 28 are assembled together so that the axial bore 34 of the sleeve member 28 is centered with respect to the impeller 22. Alternatively, the axial bores 23, 34 in the impeller 22 and the sleeve member 28 can be formed in a single operation after the impeller 22 annd sleeve member 28 have been assembled together.

The turbine 20 further includes a generally cylindrical brake member 50 having generally flat upper and lower surfaces and a generally cylindrical axial aperture 54. The brake member 50 is positioned on the lower section 32 of the sleeve member 28 proximate the upper section 30. The brake member 50 has a plurality of spaced symmetrically positioned holes 52 extending therethrough and formed generally parallel to the rotational axis of the turbine 20 and at a predetermined radial distance from the axial aperture 54. The brake member 50 is formed from an elastically deformable material such as a synthetic polymeric elastomer, for example, butyl rubber.

The brake member 50 is secured to the turbine 20 by a plurality of elongated generally cylindrical pin members or pins 56. A plurality of spaced generally cylindrical bores 36 of a predetermined depth are formed in the upper section 30 of the sleeve member 28 and are adapted to securely receive the pins 56. The bores 36 are positioned in the upper section 30 so that they can be aligned with the holes 52 formed in the brake member 50.

A generally ring-shaped pin retention member 62 having an axial opening sized to securely engage the lower section 32 of the sleeve member 28 and a plurality of spaced symmetrically positioned openings 63 formed therein is provided. The openings 63 are positioned in the pin retention member 62 so that the openings 63 can be aligned with the holes 52 formed in the brake member 50. The pin retention member 62 is securely fastened to the lower section 32 of the sleeve 28 by adhesively bonding the pin retention member 62 proximate the axial opening formed therein to the generally cylindrical surface of the lower section 32. The ring retention member 62 is positioned on the lower section 32 proximate the lower or bottom surface of the brake member 50.

The pins 56 extend from the holes 36 in the upper section 30 of the sleeve member 28, through the holes 52 formed in the brake member 50, to the openings 63 formed in the pin retention member 62. The pins 56, which are preferably formed from a high strength material such as an epoxy/glass fiber composite, are adhesively bonded within the bores 36 to the upper section 28 and within the openings 63 the ring retention member 62. However, the pins 56 are not bonded to the brake member 50. The pins 56 serve to transfer the rotational motion of the other portions of the turbine 20 to the brake member 50 which is not otherwise affixed to the turbine 20. The upper and lower surfaces of the brake member 50, while positioned proximate the lower surface of the upper section 30 and the upper surface of the pin retention member 62 respectively, are free to move radially when urged by centrifugal or elastomeric recovery forces. Instead of the specific pin structure disclosed herein, the brake member 50 may be secured to the turbine 20 by screws or any other means which provides for the radial expansion and contraction of the brake member.

The brake member 50 is deformed by centrifugal force when the turbine 20 rotates such that the diameter of the brake member 50 increases with increasing angular velocity. The diameter of the brake member 50 when stationary is selected so that the brake member 50 will contact a stationary surface positioned proximate the periphery of the brake member 50 at a predetermined angular velocity. The stationary surface can be the wall 190 of the housing 180 of the projectile fuze 200 as shown in FIG. 1. The contact of the brake member 50 with the stationary surface results in a frictional force which opposes the rotodynamic forces on the vanes 25 of the impeller 22 which would otherwise tend to increase the angular velocity of the turbine 20. Thus, the brake member 50 acts as a simple mechanical governor which moderates the angular velocity of the turbine 20.

Preferably, the diameter, material and physical characteristics of the brake member 50 and the position of the stationary surface relative to the brake member 50 are selected to yield an average angular velocity on the order of 10,000 rpm. In contrast to prior art turbines which typically operate at very high angular velocities ranging well over 100,000 rpm, the action of the brake member 50 serves to limit the angular velocity of the turbine 20 and to thus provide a more uniform electrical output from the electric generator assembly 10.

The electric generator 12 includes a rotatable element 60 comprising a generally ring-shaped permanent magnet 64 having a generally cylindrical axial aperture 68 formed therein. The magnet 64 is positioned on the lower section 32 of the sleeve member 28 proximate the lower surface of the pin retention member 62 to which the magnet 64 is adhesively bonded. A generally cylindrical ring member 66, having an axial aperture formed therein, is positioned on the lower section 32 of the sleeve member 28 proximate the lower surface of the magnet 64 to which the ring member 66 is adhesively bonded. The ring member 66 is also adhesively bonded to the cylindrical surface of the lower section 32. Bonds between the pin retention member 62 and the magnet 64 and between the ring 66 and the magnet 64 aid in securely affixing the magnet 64 to the remainder of the turbine 20.

The magnet 64 can be formed from any permanently magnetic material known in the art such as a ferromagnetic alloy. For example, Alnico alloys can be employed. Alternatively, ceramic permanent magnetic materials can be employed.

As best seen in FIGS. 2 and 3, the turbine 20 also includes a generally cylindrical elongated shaft member or shaft 40 positioned within the axial bore 34 of the sleeve member 28 and the axial bore 23 of the impeller 22 and securely affixed therein. The shaft 40 is preferably formed from a high strength material such as steel. The shaft 40 extends for a distance below the lower or bottom surface of the lower section 32 of the sleeve member 28. The shaft 40 has a generally flat bottom or axial bearing surface 42.

The shaft 40 is supported by and rotates upon a generally disk-shaped axial bearing 142 positioned below the axial bearing surface 42 of the shaft 40. The axial bearing 142 is preferably formed from a high strength stress and impact resistant material such as steel. The axial bearing 142 is supported by a generally cylindrical biasing means or elastomeric seat 140 for a purpose to be described below.

A generally cylindrical radial bearing 120 having a generally cylindrical axial aperture formed therein rotatably receives the portion of the shaft 40 extending below the lower section 32 of the sleeve member 28. The radial bearing 120 supports the shaft 40 and the turbine 20 against lateral deflection. Because the angular velocity of the turbine 20 is moderated as described above, the electric generator assembly 10 of the present invention does not require precision, high cost bearing members such as ball or roller bearings as employed in prior art electric generator assemblies. Because these costly bearings are not required, the electric generator assembly 10 of the present invention may be manufactured more quickly, easily and inexpensively than prior art electric generator assemblies.

The stationary element 78 of the electric generator 12 includes a coil housing 80 for containing a coil 90 of wire in which an electric current is generated. Leads from the coil 90 (not illustrated) are provided to supply electric current. As best seen in FIG. 3, the housing 80 has a generally annular slot or groove 88 formed therein to receive the coil 90. The coil housing 80 is generally radially symmetric. The coil 90 is wound on the coil housing by a conventional method so that the coil 90 is generally perpendicular to the axis of rotation of the turbine 20 and the magnet 64. The coil housing 80 also has a downwardly projecting skirt 84 on its periphery for a purpose to be described below.

Magnetic flux paths are provided between the rotating magnet 64 and the coil housing 80 by an upper armature member 100 and a lower armature member 108. As best in FIG. 2, the upper armature member 100 includes a generally planar, generally cross shaped central section 104 having an axial aperture 106 formed therein and a plurality of fingers 102 projecting upwardly from the periphery of the central section 104. Similarly, the symmetric lower armature member 108 has a generally planar, generally cross shaped central section 112 having an axial aperture 114 formed therein and a plurality of fingers 110 projecting upwardly from the periphery of the central section 112. As best seen in the sectional plan view of FIG. 4, the fingers 102, 110 of the upper and lower aperture members 100, 108 are spaced and arranged alternately around the periphery of the magnet 64 when the electric generator 12 is assembled. In operation, the rotating magnet 64 creates a rotating magnetic field which is conducted through the armature members 100, 108 to the coil 90 wherein it generates an electric current.

As shown in FIG. 2, the coil housing 80 has a top or upper surface having a plurality of raised generally pie-shaped sections 82. The upper armature member 100 is positioned and securely affixed to the upper surface of the coil housing 80. The raised sections 82 formed on the upper surface of the coil housing 80 serve to resist rotational forces induced in the upper armature member 100 by rotation of the magnet 64 by securely locking the central section 104 of the upper armature member 100 the coil housing 80. Similarly, the lower aperture member 108 is position so that the central section 112 projects through a plurality of slots or openings 92 formed in the downwardly projecting skirt 84 of the coil housing 80. The relative positions of the raised sections 82 and the slots 92 in the skirt 84 function to orient the upper and lower armature members 100, 108 relative to one another.

The upper and lower armature members 108 are spaced from one another by a generally cylindrical bearing holder 130 having a upper shoulder 132 and a lower shoulder 134 formed on the generally cylindrical exterior surface thereof. The bearing holder 130 includes a generally cylindrical aperture 136 formed therein and sized to securely receive the radial bearing 120. As best seen in FIG. 3, the bearing holder 130 is positioned within the axial aperture 106 of the upper armature member 100 such that the central section 104 of the upper aperture member 100 contacts and is secured to the upper shoulder 132 of the bearing holder 130. Similarly, the bearing holder 130 is positioned within the axial aperture 114 of the lower aperture member 108 such that the central section 112 of the lower aperture member 108 contacts and is secured to the lower shoulder 134 of the bearing holder 130. The bearing member 130 is itself positioned within the axial aperture 86 of the coil housing 80.

As best seen in FIG. 3, the skirt 84 of the coil housing 80 includes an upper section 96 and a lower section 94. The upper and lower sections 96, 94 share a common generally cylindrical exterior surface and each section has a generally cylindrical inner surface. However, the generally cylindrical inner surface of the upper section 96 extends further radially inwardly than the generally cylindrical inner surface of the lower section 94, thus forming a shoulder 98 between the lower and upper sections 94, 96.

A generally radially symmetric bottom member 150 having a generally cylindrical disk section 154 and a generally annular ring section 152 integrally formed with the disk 154 section is positioned below and supports the coil housing 80. The bottom member 150 is formed so that the top surface of the ring section 152 contacts the shoulder 98 formed between the upper and lower sections 96, 94 of the skirt 84 when the electric generator 12 is assembled. The disk section 154 of the bottom member 150 has a threaded axial aperture 156. A set screw 144, which supports the elastomeric seat 140, is positioned within the threaded axial aperture 156.

Adjacent the raised sections 82 of the coil housing 80 and the upper surface of the central section 104 of the upper armature member 100, a generally ringshaped shock absorbing member 72 is provided. The shock absorbing member 72 is formed from any inelastically deformable material such as a cellular polymeric material. The cellular polymeric material may be, for example, cellular polystyrene, cellular polyurethane, and the like. Cellular polystyrene is the presently preferred material. The shock absorbing member 72 functions to absorb a portion of the sudden acceleration or impact on the turbine 20 which occurs when the projectile is fired. The shock absorbing member 72 is positioned to support the turbine 20 during firing of the projectile and to moderate the effect of the impact of firing on the turbine 20.

When a shell containing the electric generator assembly is fired the shock absorbing material is compressed between the ring member 66 and the upper surfaces of the coil housing 80 and upper armature member 100. Simultaneously, the elastomeric seat 140 is compressed between the axial bearing 142 and the set screw 144. After firing the elastomeric seat 140 recovers its initial shape and urges the axial bearing 142 upward against the bottom surface 42 of the shaft 40 thus urging the turbine 20 including the ring member 66 away from the shock absorbing member 72.

Because the shock absorbing member 72 is formed from a generally inelastic material, it does not recover its initial shape after firing the projectile, but instead remains compressed. This is illustrated by dotted line 73 in FIG. 3. Firing the projectile thus creates a small gap between the shock absorbing member 72 and the ring 66 (represented by the space between the dotted line 73 and the lower surface of ring 66) permitting the turbine 20 to rotate freely without contacting the surface of the shock absorbing member 72. The position of the turbine 20 relative to the shock absorbing member 72 and the stationary element 78 of the electric generator assembly 12 may be varied by adjusting the position of the set screw 144.

The shock absorbing member 72 and the elastomeric seat 140 also moderate the effect of the impact of firing on the bearing members 120, 142. Thus, in contrast in prior art devices in which bearing failure frequently accompanies firing of the projectile, the present invention provides a highly reliable electric generator assembly 10 with reduced likelihood of bearing failure on firing.

From the foregoing description and accompanying drawings it will be seen that the present invention provides in one presently preferred embodiment a novel electric generator assembly 10 for a projectile having increased reliability in operation. Further, the present invention provides a rotational brake member 50 for controlling the angular velocity of an electric generator assembly housed within a projectile adapted to provide an electric generator 12 with a more constant output then that supplied by prior art electric generator assemblies. In addition, the present invention provides a shock absorbing member 72 for an electric generator assembly 10 housed within a projectile which functions to absorb shock to an airdriven turbine 20 when the projectile is fired.

It will be recognized by those skilled in the art that changes may be made to the above-described embodiment of the invention without departing from the broad inventive concept thereof. For example, the rotatable brake member may be employed using an airdriven turbine mounted using conventional precision bearings such as ball bearings. It is understood, therefore, that this invention is not limited to the particular embodiment disclosed, but is intended to cover all modifications which are within the scope and spirit of the invention which is defined by the appended claims.

I claim:

1. A rotatable brake member for controlling the rotational velocity of an electric generator assembly housed within a projectile, wherein the assembly includes an air-driven turbine and an electric generator having a rotatable element and a stationary element, and the turbine rotationally drives the rotatable element of the generator to produce electric power, the brake member comprising an elastically deformable material, the brake member being affixed to the turbine, and the brake member being adapted to contact a stationary surface proximate the periphery of the brake member at a predetermined angular velocity.

2. A shock absorbing member for an electric generator assembly housed within a projectile, wherein an air-driven turbine within the projectile rotationally drives a rotatable element of an electric generator to produce electric power, the generator including a stationary element and the rotatable element, the rotatable element being affixed to the turbine, the shock absorbing member comprising an inelastically deformable material positioned to absorb shock to the turbine when the projectile is fired.

3. An electric generator assembly to be housed within a projectile to provide electric power during the projectile's trajectory, the assembly comprising:
an air-driven turbine;
a rotatable brake member comprising an elastically deformable material, the brake member being affixed to the turbine, and the brake member being adapted to contact a stationary surface proximate the periphery of the brake member at a predetermined rotational speed;
an electric generator including a stationary element and a rotatable element affixed to the turbine; and
a shock absorbing member comprising an inelastically deformable material and positioned to absorb shock to the turbine when the projectile is fired.

4. An electric generator assembly according to claim 3 further comprising biasing means for biasing the turbine away from the shock absorbing member after the projectile has been fired.

5. An electric generator assembly according to claim 4 wherein the turbine includes a rotatable axial shaft member and the biasing means comprises shaft support means comprising an elastically deformable material and positioned under the shaft member.

6. An electric generator assembly according to claim 5 additionally comprising radial and axial bearing means in contact with the shaft member.

7. An electric generator assembly according to claim 6 wherein the axial bearing means is positioned intermediate the shaft member and the shaft support means.

8. An electric generator according to claim 3 wherein the turbine includes a centrifugal impeller.

9. An electric generator assembly according to claim 8 wherein the turbine additionally includes a generally radially symmetric sleeve member projecting axially downwardly from the impeller and having an axial aperture for securely receiving the shaft member, the shaft member being mounted in the axial aperture.

10. An electric generator assembly according to claim 9 wherein the rotatable element includes a magnet and the brake member and the magnet are mounted on the sleeve member.

11. An electric generator assembly according to claim 10 wherein the sleeve member comprises a generally cylindrical upper section and a generally cylindrical lower section formed integrally with the upper section and having a smaller diameter than the upper section.

12. An electric generator assembly according to claim 11 additionally comprising a plurality of pin members, the brake member containing a plurality of radially symmetrically positioned apertures, the brake member being positioned adjacent the upper section of the sleeve member, and the pin members being affixed to the upper section of the sleeve member and projecting down into the apertures of the brake member to secure the brake member to the turbine.

13. An electric generator assembly according to claim 12 additionally comprising a generally cylindrical pin retention member having a central aperture and a plurality of radially symmetric, spaced openings, the pin retention member being positioned on and affixed to the lower section of the sleeve member below and adjacent the brake member, the pin members projecting through the brake member and into the openings.

14. An electric generator assembly according to claim 13 wherein the magnet is generally ring-shaped and is positioned on the lower section of the sleeve member adjacent and below the pin retention member, the magnet being affixed to the sleeve member and the pin retention member.

15. An electric generator assembly according to claim 3 wherein the shock absorbing member is positioned between the stationary element and the rotatable element of the electric generator.

16. An electric generator assembly according to claim 9 wherein the shock absorbing member is generally ring-shaped and is positioned on the lower section of the sleeve member below the magnet.

17. An electric generator assembly according to claim 3 wherein the electric generator comprises stationary radially symmetric upper and lower armature members having generally planar central sections, and a stationary coil member including a coil and a coil housing, the central sections of the upper and lower armature members being positioned above and below the coil respectively, the armature members including a plurality of fingers projecting upwardly from the peripheries of the central sections, at least a portion of each of the fingers of the upper and lower armatures members being positioned proximate the periphery of the magnet, the fingers of the upper and lower armatures being positioned alternately around the periphery of the magnet, whereby rotation of the magnet induces an alternating electric potential in the coil.

18. An electric generator assembly according to claim 3 wherein the shock absorbing material is formed from a cellular polymeric material.

19. An electric generator assembly according to claim 18 wherein the shock absorbing member is formed from cellular polystyrene.

20. An electric generator assembly according to claim 3 wherein the brake member is formed from butyl rubber.

* * * * *